United States Patent [19]
Houck et al.

[11] 3,848,190
[45] Nov. 12, 1974

[54] SIGNAL CONDITIONER TEST SET

[75] Inventors: Walter H. Houck, Titusville; Jon D. Stigberg, Eau Gallie, both of Fla.

[73] Assignee: The United States of America as represented by the Administrator of the National Aeronautics and Space Administration, Washington, D.C.

[22] Filed: Mar. 30, 1973

[21] Appl. No.: 346,372

[52] U.S. Cl............................. 324/158 T, 324/60 C
[51] Int. Cl........................ G01r 31/22, G01r 27/26
[58] Field of Search ............. 324/158 T, 60 R, 60 C

[56] References Cited
UNITED STATES PATENTS
3,363,178  1/1968  Blanc et al....................... 324/158 T Primary Examiner—Alfred E. Smith
Assistant Examiner—Ernest F. Karlsen
Attorney, Agent, or Firm—James O. Harrell; John R. Manning

[57] ABSTRACT

A system for testing components contained in a signal conditioning module having a transistor and capacitor included in a circuit. The system includes a housing with a socket provided therein, into which the module to be tested is plugged. A test switch is provided for selectively connecting a variable load to either a transistor or capacitor in the circuit for testing the operation of such. A signal generating circuit is provided for generating signals for use in testing the components of the module.

4 Claims, 3 Drawing Figures

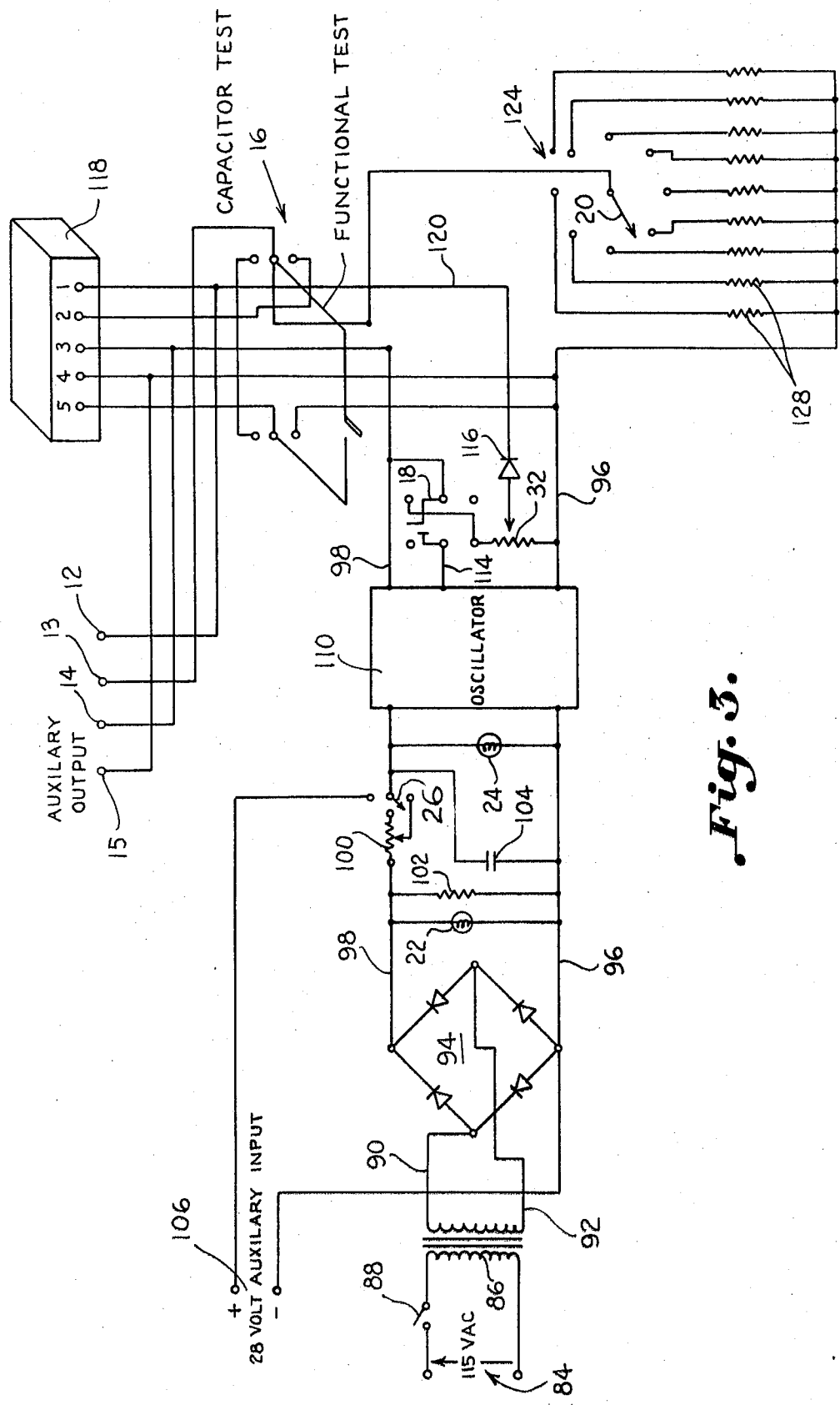

SIGNAL CONDITIONER TEST SET

ORIGIN OF INVENTION

The invention described herein, was made by employees of the United States Government, and may be manufactured and used by or for the Government for govenmental purposes without the payment of any royalties thereon or therefor.

BACKGROUND OF INVENTION

This invention relates to a signal conditioner test set, and more particularly to a test set in which signal conditioner modules can be plugged therein for testing.

Heretofore, modules have been utilized for feeding signals to computers which would condition the signals produced by closing switches and the like, to generate a signal that can be properly handled by a computer. One problem encountered with such modules is failures of certain components included therein, such as capacitors, transistors and other elements. In order to analyze these modules to determine the cause of the failures it has been necessary to send the modules back to the manufacturer.

The circuit constructed in accordance with the present invention enables an efficient test to be performed on the modules in order to analyze the operability of the components contained therein. This is accomplished by merely plugging the module into a console, and by selectively closing switches assigned for testing the various components, the module can be tested on site.

One reason it is desired to know immediately the cause of the failure of a module is that such may be created by some other component associated with the system. Normally, in order to make a completely thorough analysis of a particular module it is necessary to saw the module in half so as to visually observe the components. This, of course, destroys the module and frequently destroys the component which failed, preventing accurate analysis.

SUMMARY OF INVENTION

A system for testing components contained in a signal producing module which has a transistor with base emitter and collector electrodes provided thereon. First, second and third pins are coupled to the electrodes while a fourth pin is coupled to one side of a capacitor included in the circuit. The other side of the capacitor is connected to the base electrode of the transistor. The system includes a housing having a front panel with sockets provided therein adapted for receiving corresponding pins provided on the module. A signal generating circuit is provided for producing a signal in order to test the operability of the module. A switch means having a first and second operable position is provided for selectively connecting a variable resistance load to either the emitter electrode of the transistor or to the capacitor for testing the operability of the entire modules and the capacitor. An oscilloscope is coupled to one of the sockets provided on the front panel for producing a picture of the wave form appearing at the emitter electrode.

Accordingly, it is an important object of the present invention to provide a signal conditioner test set which can readily test a sealed module in order to give an initial indication as to the components that fail therein.

Another important object of the present invention is to provide a simple and inexpensive system which can be readily used to test the component of modules which are sealed in a synthetic housing, such as bakelite, without destroying the housing and module.

These and other objects and advantages of the invention will become apparent upon reference to the following specification, attendant claims and drawings.

BRIEF DESCRIPTION OF THE DRAWINGS

FIG. 3 is a schematic diagram illustrating the various components included in the signal conditioner test set.

Figure 1:
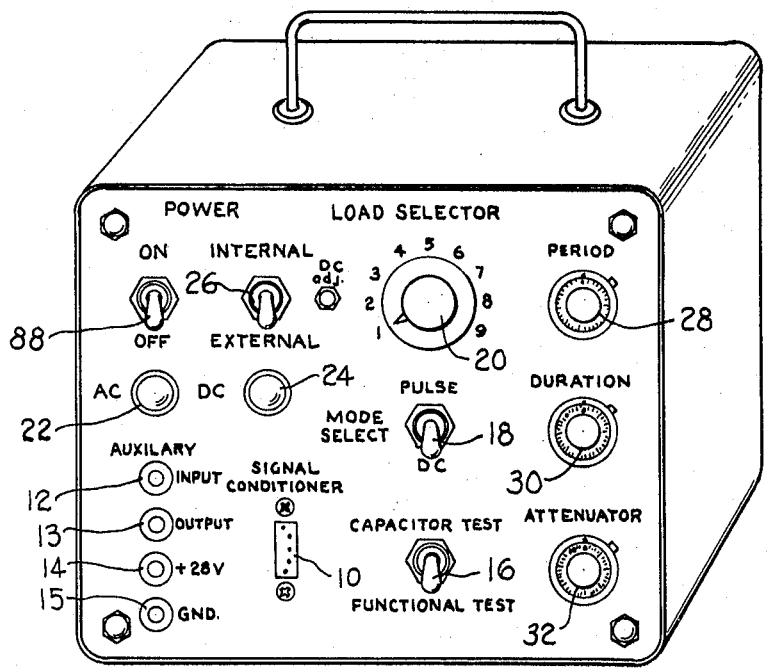
FIG. 1 is a perspective view illustrating a front panel of a signal conditioner constructed in accordance with the present invention.

Referring in more detail to FIG. 1 of the drawings, there is illustrated a front panel of a test set constructed in accordance with the present invention. A module which is to be tested, has five pins associated therewith, which are plugged directly into a socket 10 carried on the front panel. The socket provided in FIG. 1 is adapted to test a module having five pins. However, it is to be understood that modules of various configurations can be tested by the tester by use of the auxiliary plugs 12 through 15. The auxiliary plugs may be attached to the pins of a particular socket by means of alligator clips. They are appropriately labeled indicating one particular use adapted thereto. The components shown on the front panel in FIG. 1 and the function thereof will only be described briefly, since they are described in more detail in describing the schematic diagram of FIG. 3. Shown next to the signal conditioner socket 10 is a switch 16 which is adapted to be placed in either a low position wherein the functionality of a module is tested. When the switch 16 is placed in the "UP" position a capacitor included in the module is tested. Directly above the switch 16 is a mode select switch 18 which can be raised or lowered to select either a pulse signal from a signal generating source or a D.C. signal. Various size loads may be selected by rotating a load selector switch 20. Also, provided on the front panel are lamps 22 and 24 for indicating whether A.C. or D.C. power is applied. There is a power "ON" switch 88 and a power "SELECT" switch shifted from an external D.C. power source to an internal power source. On the right-hand side of the front panel are three rotatable knobs 28, 30 and 32. These knobs are included as part of an oscillator for controlling the period and duration of the output pulses generated by the oscillator. The knob 32 is directly connected to attenuating resistor appropriately labeled in FIG. 3 of the drawings.

Figure 2:
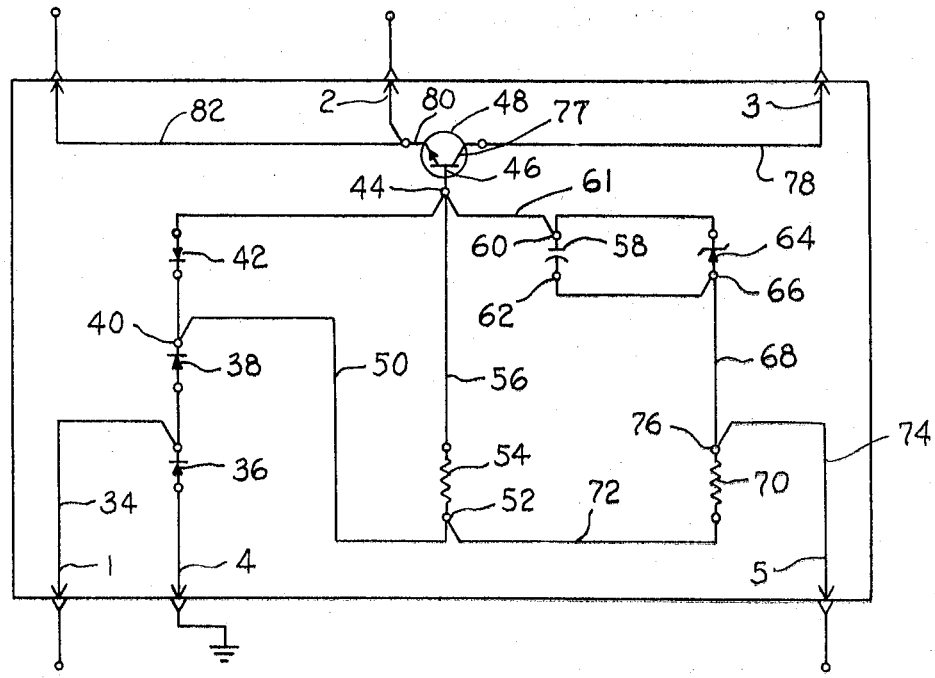
FIG. 2 is a schematic diagram illustrating the circuit included in a particular module that is to be tested.

Shown in FIG. 2 is a schematic representation of one particular module that is to be tested. The input to the module is applied to an input terminal 1, and is fed by lead 34 to the cathode side of a diode 36. The anode side of diode 36 is connected to a pin 4, which is, in turn, coupled to ground. Connected also to the anode side of diode 36 is the cathode of another diode 38. The anode of diode 38 is coupled to a junction 40. Also coupled to junction 40 is the anode of still another diode 42. The diode 42 is interposed in a circuit extending between junction 40 and a junction 44 to which a base electrode 46 of a transistor 48 is coupled. The diodes 36, 38 and 42 are isolation diodes which direct the signal coming in over input lead 34 through diode 38 to a lead 50. Lead 50 is interposed between junction 40 and another junction 52. Connected to the other side of junction 52 is a resistor 54 which has its other side coupled to junction 44 via means of lead 56. Also, connected to the base electrode 46 of the transistor 48 is a capacitor 58. The capacitor 58 is connected between junctions 60 and 62. Junction 60 is, in turn, coupled via means of lead 61 to junction 44. A Zener diode 64 is connected in shunt with the capacitor 58, between junction 66 and junction 60. The junction 66 is, in turn, connected by means of lead 68 to one side of a resistor 70. The other side of resistor 70 is connected by means of lead 72 back to junction 52. A common lead 74 is connected between a pin 5 and a junction 76 interposed in lead 68 directly above resistor 70.

The transistor 48 has a collector electrode 77 which is coupled by lead 78 to pin 3. An emitter electrode 80 of a transistor 48 is coupled to a pin terminal 2. This terminal 2 forms the output for the module. A system test point is also coupled to the emitter electrode 80 by means of a lead 82 so that an oscilloscope or the like, may be attached to the emitter electrode for observing the operation of the transistor 48. The transistor 48 is coupled in a conventional signal conditioning manner; that is, an input signal is applied to the base electrode of the transistor for allowing the transistor to turn on. When the transistor turns on current flows between the collector and emitter electrodes producing an output signal on the output terminal 2. The capacitor network 60 around which the Zener diode 64 is connected in shunt merely acts as a filter circuit for the transistor.

It is to be understood, of course, that each of the pin connections labeled 1, 2, 3, 4 and 5 are adapted to be plugged into the socket 10 on the front panel of the signal conditioner test set for testing the operation of such.

The details of the test set are shown in FIG. 3 and include an input power supply 84 which is a 115 volt A.C. signal that is fed to an input winding of a transformer 86. Interposed between the source of power 84 and the input winding 86 of the transformer is a switch 88. The output side of the transformer 86 is connected via leads 90 and 92 to a full wave rectifier 94 which rectifies the 28 volt signal appearing on the secondary of the transformer 86. The output of the full wave rectifier 94 is, in turn, coupled between line 96 and 98. Line 96 will be referred to as the common lead throughout the circuit. The power bus 98 has slightly in excess of 28 volts D.C. thereon. A trim pot 100 is connected in series with the bus line 98 for reducing the voltage from the full wave rectifier to approximately 28 volts.

Connected between lines 98 and 96 is the yellow lamp 22, which when illuminated indicates that an A.C. signal is present. A filter circuit consisting of resistor 102 and capacitor 104 is connected across leads 98 and 96 for filtering the output of the full wave rectifier 94.

An auxiliary power supply 106 is connected across leads 98 and 96 so that such can be utilized instead of the signal being supplied by the full wave rectifier 94. This auxiliary signal may be produced by any suitable D.C. power supply. A lamp 24 is connected between leads 98 and 96 after a switch 26 that is used to either select the output from the full wave rectifier or the external auxiliary power supply, and when such is illuminated indicates that there is a D.C. signal present at that point in the circuit.

The D.C. voltage across leads 98 and 96 is then fed into an oscillator 110 which has coupled to its output a double pole-double throw switch 18. The double pole-double throw switch is provided to either connect the output lead 114 from the oscillator to variable resistor 32 or connect the D.C. bus-line 98 to the variable resistor 32. When the output lead 114 of the oscillator is connected to the variable resistor 32 a chain of pulses are produced for testing the module and applied through the variable resistor 32. When the double pole-double throw switch 18 is in the "UP" position a D.C. signal is applied through the diode 116 to the module being tested. Therefore, the circuit which includes the oscillator and the rectifier acts as a signal generating source for generating either a D.C. signal of a predetermined value or a chain of pulses. The attenuating resistor 32, which may be adjusted to vary the amptitude of either the D.C. signal or the pulse being fed therethrough applies these signals through a diode 116 to socket 1 on the front panel into which pin 1 of the module is plugged. It is noted that the sockets labeled 1, 2, 3, 4 and 5 have auxiliary jacks coupled thereto so that modules which have configurations that do not conform to the configurations of the socket shown on the front panel of the tester can be tested by merely using clips and the like.

The module is identified by reference character 118 in FIG. 3, and has pins 1 through 5 which are plugged into corresponding numbered sockets provided in the plug 10 on the signal conditioner test set.

As can be seen, pin 1 is coupled via lead 120 to the anode side of diode 116 for receiving either a pulse or D.C. signal, depending on the position of the switch 18. Pin 1 is, of course, connected to the base electrode of the transistor 48 of the test module.

Pin 3 is connected directly to the positive bus-line 98, while pin 4 is connected directly to the common bus-line 96.

Pins 2 and 5 are coupled to a double throw-double pole switch, generally designated by the reference character 16. The double pole-double throw switch 16 is wired so that when it is in the lower position, which occurs when there is a functional test being performed, terminal 2 is connected to a variable load resistor, generally designated by the reference character 124. The variable resistive load 124 includes a rotatable arm 20 which is adapted to be connected to resistors 128 of various values. When the switch 16 is in the functional test position terminal 5 is connected to the common lead 96. When the double pole-double throw switch 16 is in the upper position, which is referred as the capacitor test position, terminal 2 is part of an open circuit, whereas, terminal 5 is connected through the switch 16 to the variable resistive load 124.

In testing the operability of the module, first switch 16 is placed in the "UP" position for applying a D.C. signal across leads 98 and 120. The switch 16 is placed in the lower functional test position, wherein, the emitter electrode 80 of the transistor 48 is coupled to the load resistors 128 by means of terminal 2 and switch 16. If the module is operating properly, by connecting an oscilloscope to the output terminal 13 a pulse wave form will be observed. If the module 118 is not operating properly, then no pulse output will appear.

Test switch 16 is then moved to the upper capacitor test position for testing the capacitor 58 located in the module 118. In this position the load, which comes through switch 124, is connected to socket 5 of the signal conditioner tester and, if the capacitor 58 is operating properly, a pulse having a discharge characteristic thereon will appear on the oscilloscope. If the capacitor is shorted there will be no discharge shown on the wave form. Furthermore, if the capacitor is open, there will also be no discharge shown on the pulse.

The purpose of the multi-position load 128 is to enable simulation of various loads as closely as possible to conditions encountered by the module under test.

While a preferred embodiment of the invention has been described using specific terms, such description is for illustrative purposes only, and it is to be understood that changes and variations may be made without departing from the spirit or scope of the following claims.

What is claimed is:

1. A system for testing components contained in a signal producing module having a transistor with base, emitter and collector electrodes, first, second and third pins coupled to said electrodes respectively, a fourth pin coupled to one side of a capacitor while the other side of said capacitor is connected to said base electrode of said transistor, said system comprising:
   A. a housing having a front panel,
   B. first, second, third and fourth sockets adapted for receiving a correspondingly numbered pin of said module for testing said module,
   C. a variable resistance load having a first terminal connected to ground,
   D. switch means having a first and second operable position,
   E. said switch means when in said first operable position coupling a second terminal of said variable resistance load to said emitter electrode of said transistor by means of the second socket,
   F. a signal generating circuit coupled between a reference terminal connected to ground and said third socket for applying a signal to said collector electrode of said transistor, said signal generator also having means for applying a second signal between said first terminal and said reference terminal,
   G. an oscilloscope having a reference terminal connected to ground and a testing terminal,
   H. means for connecting said testing terminal of said oscilloscope to said second socket when said switch means is in said first operable position for producing a picture of the wave form appearing at said emitter electrode, and
   I. said switch means when in said second operable position connecting said second terminal of variable resistance load to said one side of said capacitor by means of the fourth socket and to said testing terminal of said oscilloscope for testing the operability of said capacitor.

2. The systems as set forth in claim 1, wherein said signal generating means includes,
   A. a D.C. power supply,
   B. a pulse producing means, and
   C. switch means for selectively coupling either said D.C. power supply or said pulse producing means to said module being tested.

3. The system as set forth in claim 1, wherein said variable resistance load includes,
   A. a plurality of resistors of different resistance values, and
   B. a selective switch means for selecting one of said resistors for determining the value of said resistance load.

4. The system as set forth in claim 1, wherein said signal generating circuit includes,
   A. an A.C. power supply,
   B. a circuit including a full wave recitifer coupled to said A.C. power supply generating a D.C. voltage, and
   C. an oscillator means coupled to said full wave rectifier for generating a chain of pulses.

* * * * *